United States Patent

[11] 3,577,210

[72] Inventor Hans G. Dill
Costa Mesa, Calif.

[21] Appl. No. 799,817
[22] Filed Feb. 17, 1969
[45] Patented May 4, 1971

[73] Assignee Hughes Aircraft Company
Culver City, Calif.

[54] SOLID-STATE STORAGE DEVICE
30 Claims, 5 Drawing Figs.

[52] U.S. Cl. .......... 317/235, 340/173
[51] Int. Cl. .......... H01l 11/00, H01l 11/14
[50] Field of Search .......... 317/235.21.1, 235.42

[56] References Cited
UNITED STATES PATENTS

| | | | |
|---|---|---|---|
| 3,436,623 | 4/1969 | Beer | 317/235 |
| 3,500,142 | 3/1970 | Kahng | 317/235 |

*Primary Examiner*—Jerry D. Craig
*Attorneys*—James K. Haskell and Paul M. Cable

ABSTRACT: A solid-state storage device in the form of an insulated gate field effect tetrode. A depletion region is created in the channel so that an electric field emanating from one gate can penetrate the channel and attract high energy charge carriers into traps in the insulator. The charge carriers enter the insulator by surmounting the Schottky barrier at the semiconductor-insulator interface.

Hans G. Dill,
INVENTOR.
BY.
J H Haskell
ATTORNEY.

Hans G. Dill,
INVENTOR.
BY.
J. K. Haskell
ATTORNEY.

SOLID-STATE STORAGE DEVICE

Solid-state storage devices comprising semiconductor-insulator-insulator sandwich structures wherein charged carriers are stored in insulator-insulator interface traps are known in the art. An Insulated Gate Field Effect Transistor (IGFET) where the gate is isolated from the channel by two insulating layers of material is an example of such a device wherein three modes of operation are possible: a storage mode, a reading mode, and an erasing mode.

In the reading mode, the IGFET performs the same function as in an amplifier wherein carriers flow from the source, through the channel, and into the drain. The gate provides a control voltage for modulating the channel current. In the storage mode, a different potential is applied to the gate in order to permit the charged carriers flowing in the channel to enter the insulator. This entrance into the insulator is accomplished by means of tunneling. The conduction band minimum in the insulator is at a higher energy than that of the semiconductor channel, therefore electrons at the bottom of the semiconductor conduction band cannot enter the insulator conduction band due to insufficient energy. This barrier seen by the electrons in the channel is known as a Schottky barrier. However, when a larger potential is applied to this gate, the insulator conduction band energy is altered in such a manner that the probability of electrons in the conduction band of the insulator becomes greater. When this potential is large enough, these electrons penetrate the barrier. Such penetration is called tunneling. (If the carriers in the channel are holes rather than electrons, the energies of the valance bands must be considered rather than those of the conduction bands.) In the erasing mode, the biasing voltage on the gate is reversed, causing the trapped carriers to tunnel back into the semiconductor.

An IGFET is usually to amplify an electrical signal. In order to achieve amplification, a minimum voltage must be applied to the gate of the IGFET. This voltage is referred to as the threshold voltage of the IGFET. If this threshold voltage is not applied to the gate, no carriers will flow through the channel and no amplification will result. When operated in the storage mode, the threshold voltage is altered. Storage devices using the threshold change of a silicon dioxide-silicon nitride ($SiO_2$—$Si_3N_4$) sandwich structure are described by B. V. Keshavan and H. C. Lin Nonvolatile MNOS Memory, 1968 GOMAC, p. 340) and by R. E. Oleksiak, A. J. Lincoln and H. A. R. Wegener (An Electrically Alterable Nonvolatile Semiconductor Memory, 1968 GOMAC, pg. 342).

In the paper by Keshavan et al. a metal-silicon nitride-silicon dioxide-silicon sandwich structure is described wherein the metal constituted the gate in a field effect transistor. When the proper bias arrangement was applied to the device, charged carriers from the silicon tunneled through the silicon dioxide layer and were trapped in defects at the $SiO_2$—$Si_3N_4$ interface. Thus, digital information could be written into the interface since the presence or absence of charge in these traps constitute information.

The paper by Oleksiak et al. describes a memory involving an insulated gate field effect transistor wherein the threshold voltage of the device is altered when information is written. The writing is done, as before, by causing charged carriers to be stored in $Si_3N_4$ traps at the $SiO_2$—$Si_3N_4$ interface.

When tunneling is employed as the writing mechanism in such a sandwich structure, the potential applied to the gate tends to approach a level which will cause a short circuit from the channel through the insulating layers to the gate. The possibility of the occurrence of this situation, known as high field breakdown, must be tolerated if tunneling is desired, since the high potential is necessary to achieve penetration by the carriers of the Schottky barrier at the insulator-semiconductor interface. Thus, the higher the potential, the easier it is to achieve tunneling. However, this higher potential operation has the disadvantage of possible high field breakdown and, therefore, the device is rendered less reliable.

It is therefore an object of the present invention to provide a new and improved storage device.

It is another object of this invention to provide a more reliable storage device.

A further object of the invention is to provide a solid-state storage device wherein the writing potential is significantly below the high field breakdown level.

To carry out the aforementioned objects, tunneling is dispensed with as the writing mechanism. By proper biasing, appropriate bending of the semiconductor conduction band is achieved, which in turn allows some of the charged carriers in the substrate to acquire sufficient energy to surmount rather than penetrate, the Schottky barrier at the semiconductor-insulator interface. This enables these carriers to enter into and pass through the first insulator and be trapped at the insulator-insulator interface or in the second insulator. The advantage of this method over tunneling is that the gate potential is appreciably lower than it is during tunneling.

Accordingly, it is yet another object of the present invention to provide a solid-state storage device with a surmountable Schottky barrier.

These and other objects and advantages are provided according to one embodiment of the invention by a solid-state storage device comprising: a semiconductor substrate having spaced source and drain regions within the substrate and with a charged carrier path therebetween; a first layer of insulating material disposed adjacent to and in physical contact with a surface of the substrate so as to define a Schottky barrier at the surface; a first gate disposed adjacent to and in physical contact with part of the first insulating layer and also overlying part of the channel; a second insulating layer in physical contact with the first gate and over the first insulating layer; and a second gate adjacent the second insulating layer for providing a potential for accelerating the higher energy charged carriers over the Schottky barrier and into the aforementioned first insulating layer.

When the proper bias voltages are applied to the device, a situation is created wherein charged carriers near the semiconductor-insulator interface, having sufficiently high energy, are able to surmount the Schottky barrier. These high energy carriers then travel through the first insulating layer and are trapped and stored in traps in the second insulating layer near the insulator-insulator interface. These traps usually constitute defects in the structure of the insulating layer. The defects might be dislocations or the absence of atoms from their lattice sites or any other irregularities in the insulator or any combination of these.

Once the carriers are trapped, storage can be maintained without further application of power to the device. This means the device is nonvolatile.

The invention will be described in greater detail by reference to the drawings in which.

Figure 1:
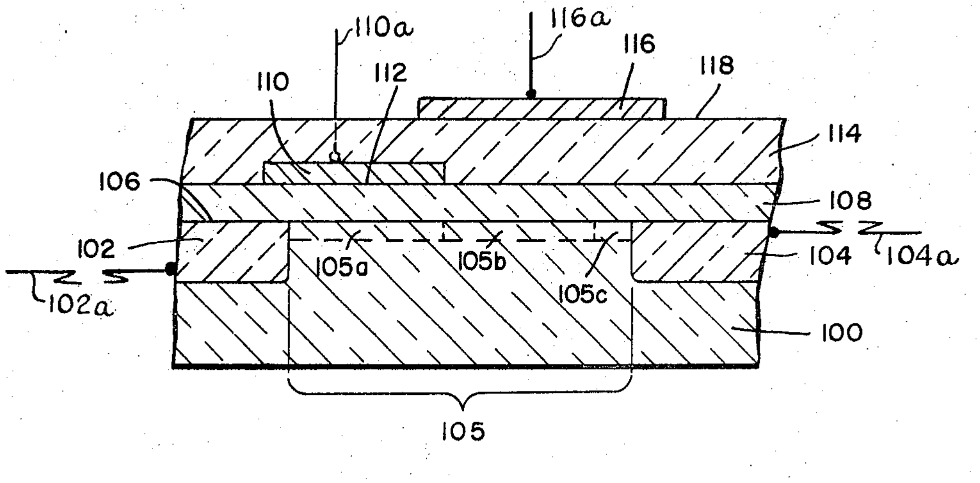
FIG. 1 is a cross-sectional elevational view of a solid-state storage device in accordance with one embodiment of the present invention.
Figure 4:
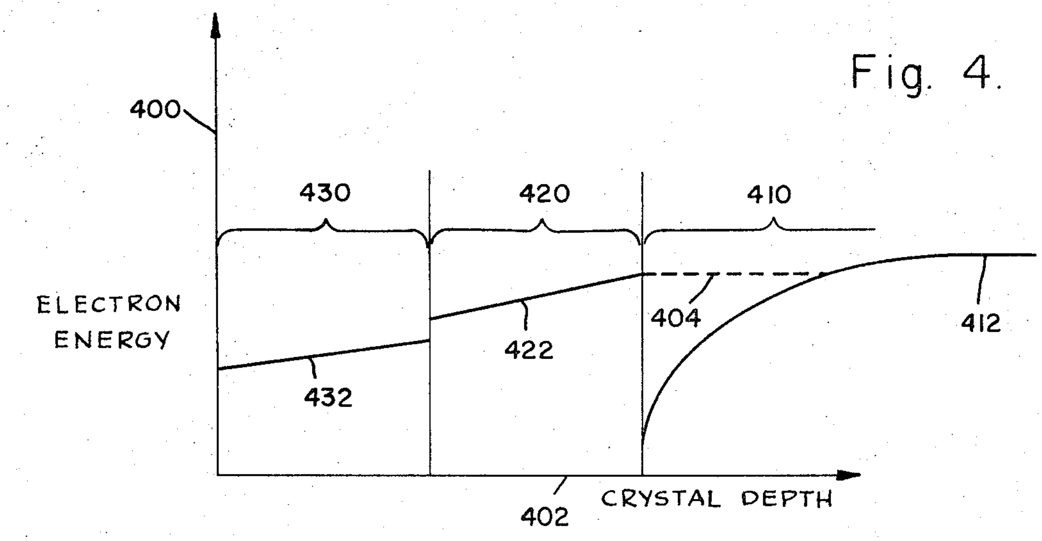
Figure 5:
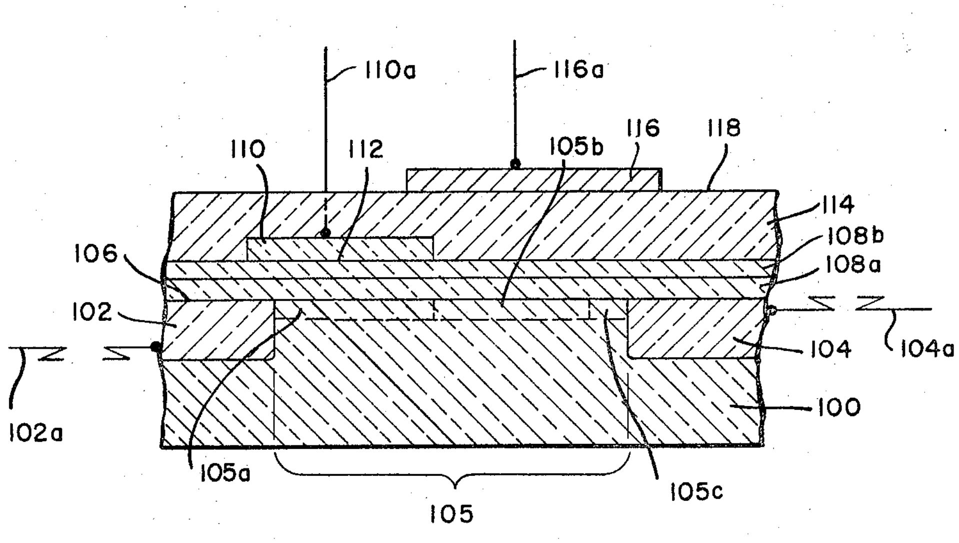

FIG. 4 is an energy band representation of the semiconductor-insulator-insulator structure of the embodiment of the invention, illustrated in FIG. 1, biased for storage mode operation wherein the vertical axis represent electron energy and the horizontal axis represents crystal depth; and FIG. 5 is a cross sectional elevational view of a solid-state storage device in accordance with another embodiment of the invention.

Referring now to FIG. 1, a portion of a semiconductor substrate 100 is shown within which is contained spaced source and drain regions 102 and 104, respectively, disposed adjacent a common surface 106. Connecting means **102*a*** and 104*a* are connected to source 102 and drain 104, respectively. A charge carrier path 105 is disposed within the substrate 100 and adjacent the common surface 106. This path extends from the source 102 to the drain 104 and comprises three regions. The first path region 105*a* extends from the source 102 partially towards the drain 104. The third path region 105*c* extends from the drain 104 partially towards the source 102. The second path region 105*b* extends from the first path region 105*a* to the third path region 105*c*. An insulating layer 108 is disposed adjacent to and in physical contact with the common surface 106.

When silicon is used as the semiconductor substrate material, the surface can be oxidized to form an insulating layer of silicon dioxide. The semiconductor substrate material is not limited to silicon, however, nor is the insulating layer material limited to silicon dioxide. The insulating layer 108 must, however, be such that a Schottky barrier is established at the surface 106 between it and the substrate 100. A Schottky barrier as used herein and in the claims means an energy relationship existing at the interface between an insulator and a semiconductor wherein the minimum energy of the insulator conduction band is higher than the minimum energy of the semiconductor conduction band. This is for the case where the carriers are electrons, and the energy referred to is electron energy. When the carriers are holes, the minimum energy of the insulator valence band is higher than that of the semiconductor valance band, energy now referring to hole energy which is measured negatively with respect to electron energy.

A gate 110 having a connecting means 110 connected thereto, is disposed adjacent to and in physical contact with that part of the surface 112 of the insulating layer 108 which in turn overlies the first channel region 105*a*. The gate 110 usually overlaps the source 102; however, it needn't so long as it is near enough to the source 102 to create the desired charged carrier path 105 under proper bias conditions. Under such conditions, carriers (holes in N-type material or electrons in P-type) can move from the source 102 towards the drain 104. The gate 110 is shown to be a metal, however, it need only be of such a material that the proper bias potential can be established to create the channel 105. For example, a nonmetallic transducer such as a piezoelectric crystal or any other transducer which could convert other forms of energy into electrical potential energy would suffice.

A second insulating layer 114 is disposed adjacent to and in physical contact with surface 112, as well as over the gate 110 so as to completely cover the gate 110, thereby insulating the gate 110. A second gate 116, having a connecting means 116*a* connected thereto, is disposed adjacent to and in physical contact with the surface 118 of the second insulating layer 114, so as to overlap most of the second and third channel regions 105*b* and 105*c*. The combination of the bias on the second gate 116 and the bias on the drain 104 should produce a field effect in the channel 105 such that low energy carriers are swept toward the drain, the result being that the second channel region 105*b* becomes devoid of low energy carriers. The third channel region 105*c* resembles the first channel region 105*a* in that there is an accumulation of low energy carriers there. By creating this depletion region in the second channel region 105*b*, there results an absence of accumulated charge there which would otherwise terminate the effect of the electric filed emanating from the second gate 116, thereby preventing that field from penetrating into the channel 105, and thus from attracting the higher energy carriers into the first insulator layer 108. The second gate 116 normally overlaps the drain 104 and the gate 110; however, this is not necessary so long as the second gate 116 overlaps the second channel region 105*b* and the third channel region 105*c* to points close enough to first channel region 105*a* and the drain 104, respectively, to ensure that the drain and second gate potentials will exert proper influence upon the carriers emanating from the source 102 required to achieve storage. This ensures that a depletion region will exist in the second channel region 105*b* and that the low energy carriers will be attracted towards the drain so that the high energy carriers can be attracted into the first insulator layer 108.

It should be noted here that if a transistor structure were used wherein, a single gate covered the channel, a depletion region could be achieved only if the drain bias voltage were greater than the voltage applied at the gate. The resultant field from the gate would then repel rather than attract the charged carriers in the channel. Therefore, a single gate device such as a transistor could not be used for storage.

Silicon nitride ($Si_3N_4$) has been used as the second insulating layer material when silicon dioxide $SiO_2$ was used as the material for the first insulating layer. However, the second insulating layer material is not limited to $Si_3N_4$ so long as it can provide the necessary carrier traps needed for storage.

For a channel length of 0.6 mils, a first insulation layer thickness of 1500 A., and a second insulation layer thickness of 2500 A., typical operating potentials for the storage mode are: $V_{g1}$=0, $V_{g2}$=30v., $V_D$=20 v., and $V_S$=0, where $V_{g1}$, $V_{g2}$, $V_D$, and $V_S$ are the potentials on the first gate, the second gate, the drain, and the source, respectively. Typical operating potentials for the reading mode for the same device are: $V_{g1}$=0, $V_{g2}$=10 v., $V_D$=10 v., and $V_S$=0.

In accordance with another embodiment of the invention, illustrated in FIG. 5, a pair of insulating layers 108*a* and 108*b* are employed instead of the insulating layer 108 of FIG. 1, the insulating layer 108*b*, having traps distributed therein for trapping charge carriers. The insulation layer 108*b* completely insulates the first gate 110 from the insulating layer 108*a*. This permits the first insulating layer 108 in the embodiment of FIG. 5 to be thinner than the insulating layer 108 of FIG. 1 while the first gate 110 is kept at the same distance from the substrate 100 as in the embodiment of FIG. 1. The advantage gained with the embodiment of FIG. 5 is that since the carriers are trapped closer to the substrate, the stored information can be interrogated with a lower potential on the second gate 116. In the embodiment of FIG. 5 third insulation layer 114 insulates the first gate 110 from the second gate 116. Storage occurs in traps in the layer 108*b* neat the interface of the first and second insulating layers 108*a* and 108*b* respectively. The material for the second and third insulation layers 108*b* and 114, respectively would probably be the same, although it needn't be.

If it in accordance with the invention in desired to be able to operate a storage device in accordance with the invention in an erase mode (so that the device can read and write alternatively), the first insulating layer 108, or 108*a* must be thin enough for the stored carriers to tunnel out of the traps and through the first insulator layer 108, or 108*a* into the semiconductor substrate 100. The triple insulator layer embodiment of FIG. 5 facilitate this mode of operation because the first insulator layer 108*a* is sufficiently thin to permit such tunneling to occur.

The second gate 116 is also shown to be a metal, however, other materials may be substituted. The only necessary equipment of the second gate 116, in this respect, is that it facilitate application of the necessary potential (known as the writing potential or storage potential) for accelerating carriers flowing in the channel, thereby urging them over the Schottky barrier and into the insulator sandwich structure. For example, a transducer which converts sound into electrical potential energy could be used as the gate, and could other transducers which convert other forms of energy into electrical potential energy. A sound transducer would allow an array of these devices to store voice patterns, for example. Storage of voice patterns could be accomplished by using sound transducers as the second gates in an array of these devices.

Figure 2:
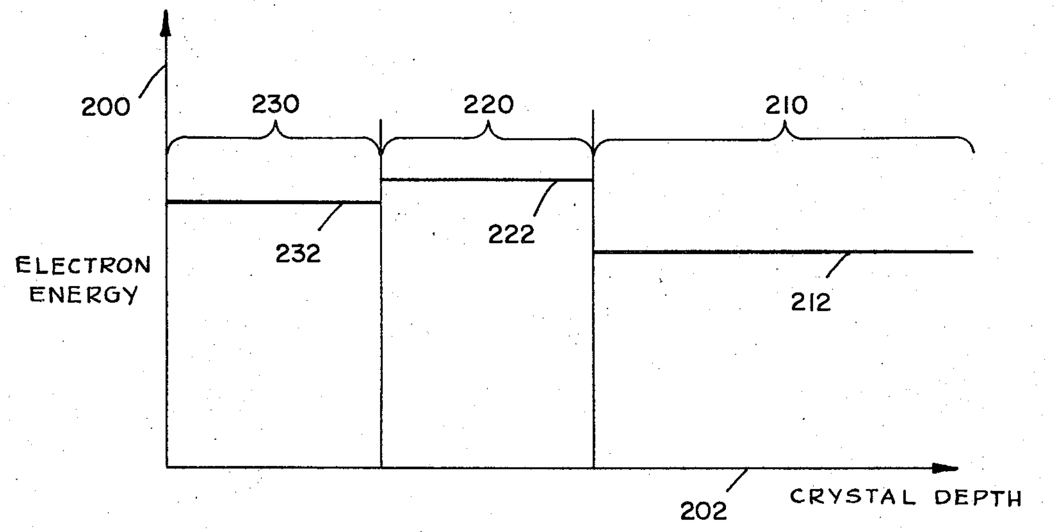
FIG. 2 is an energy band representation of the semiconductor-insulator-insulator structure of the invention in the unbiased state wherein the vertical axis represents electron energy and the horizontal axis represents crystal depth.

In FIG. 2 the vertical axis 200 represents electron energy and the horizontal axis 202 represents depth in the device, the cross section plane being taken beneath the second gate between the source and drain. Region 210 is the semiconductor substrate; region 220 is the first insulating layer; region 230 is the second insulating layer. Horizontal lines 212, 222 and 232 represent the bottoms of the conduction bands of regions 210, 220 and 230, respectively. In this unbiased state the electrons in the semiconductor 210 do not have enough energy to enter the conduction band 222 of the first insulator 220. This is seen from the fact that the minimum energy of conduction band 212 is lower than that of band 222. This description applies in the case where the charged carriers being discussed are electrons. When holes are discussed, the lines 212, 222 and 232 represent the valance bands of regions 210, 220 and 230 respectively, and the vertical axis 200 represents hole energy.

Figure 3:
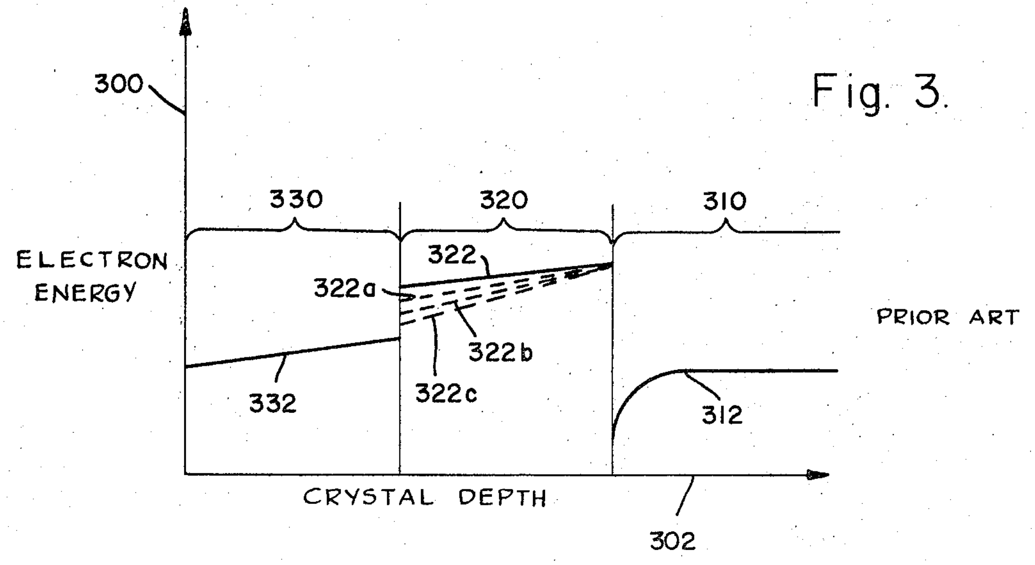
FIG. 3 is an energy band representation of the stacked gate of a conventional prior art field effect device biased for tunneling wherein the vertical axis represents electron energy and the horizontal axis represents crystal depth.

In FIG. 3 the vertical axis 300 represents electron energy and the horizontal axis 302 represents depth in the device the cross section plane being taken beneath the second gate between the source and drain of a conventional prior art field effect tetrode biased for tunneling. Regions 310, 320 and 330 represent the semiconductor substrate, the first insulation later, and the second insulation layer, respectively. Curves 312, 322 and 332 are the bottoms of the conduction bands of regions 310, 320 and 330, respectively. The slopes of bands 322 and 332 and the curvature of band 312 are produced by the biasing potential on the gate. The dotted lines 322*a*, *b* and *c* represent band 322 under progressively increased bias potential. The steeper the slope of band 322, the greater is the probability of achieving tunneling. In that event, electrons in the conduction band 312 tunnel through the surface barrier between regions 310 and 320 and then travel to trap sites near the interface between regions 320 and 330 where they are stopped. However, the steeper the slope, i.e. the greater the bias potential, the greater the risk of high field breakdown. This description applies in the case where the charged carriers being discussed are electrons. When holes are discussed, the lines 312, 322, and 332 represent the valence bands of regions 310, 320 and 330, respectively, and the vertical axis 300 represents hole energy.

In FIG. 4, the vertical axis 400 represents electron energy and the horizontal axis 402 represents depth in the device, the cross section plane being taken beneath the second gate between the source and drain. Regions 410, 420 and 430 represent the semiconductor substrate, the first insulation layer and the second insulation layer, respectively. The conduction band minimums 422 and 432 of the first and second insulating layers, respectively, slope because of the bias potential on the second gate. The curvature of the substrate conduction band minimum 412 is accounted for by the second gate potential also. But the fact that the horizontal part of band minimum 412 is at a higher energy than band minimum 422 is due in part to the bias on the drain which attracts lower energy electrons from the channel. This eliminates buildup of charge present during the tunneling mode operation described in FIG. 3 and creates a depletion region in the channel. As a result, some electrons acquire an energy greater than that represented by the dotted line 404 and can, therefore, surmount the Schottky barrier and enter the insulator. This description applies in the case where the charged carriers being discussed are electrons. When holes are discussed, the lines 412, 422 and 432 represent the valence bands of regions 410, 420 and 430, respectively, and the vertical axis 400 represents hole energy.

There has thus been shown and described a solid-state storage device capable of storing information at potentials significantly below high field breakdown thereby rendering it a more reliable storage device.

Although specific embodiments of the invention have been described in detail, other variations of the embodiment shown may be made within the spirit and scope of the invention.

Accordingly, it is intended that the foregoing disclosure and drawings shall be considered only as illustrations of the principles of this invention and are not to be construed in a limiting sense.

I claim:

1. A solid-state storage device comprising:

a semiconductor substrate;

means within said substrate defining and regions of a charge carrier path;

means for storing charge carriers and including insulating material disposed adjacent to and in physical contact with a surface of said substrate and defining a Schottky barrier at said surface;

means for electrically establishing said charge carrier path whereby charge carriers are caused to flow therethrough;

an electrode disposed adjacent to and in physical contact with said charge carrier storing means and insulated from said substrate; and means for applying relative potentials between said electrode and said end regions of said charge carrier path to establish a depletion region within said charge carrier path and to urge charge carriers traversing said path over said Schottky barrier and into said charge carrier storing means.

2. The combination claimed in claim 1, wherein the first named means includes spaced source and drain regions disposed within and adjacent to said surface of said substrate.

3. The combination claimed in claim 2 wherein said means for establishing said charge carrier path includes a gate electrode disposed adjacent to and in physical contact with at least part of said charge carrier storing means whereby a bias potential can be applied to electrically establish said charge carrier path.

4. The combination claimed in claim 1 wherein said charge carrier storing means includes a first layer of insulating material having a first surface disposed adjacent to and in physical contact with said surface of said substrate and a second layer of insulating material having a first surface disposed adjacent to and in physical contact with at least a portion of a second surface of said first layer of insulating material, said second layer having trap means for trapping and storing charge carriers.

5. The combination claimed in claim 4 wherein said trap means comprise structural defects in said second layer.

6. The combination claimed in claim 2 wherein said source region and said drain region are of N-type conductivity and said charge carriers are electrons.

7. The combination claimed in claim 2, wherein said source region and said drain region are of P-type conductivity and said charge carriers are holes.

8. A solid- state storage device comprising:

a. a semiconductor substrate having spaced source and drain regions disposed within and adjacent a common surface of said substrate;

b. a first layer of insulating material having a first surface disposed adjacent to and in physical contact with said common surface of said substrate, the interface between said substrate and said first insulating layer defining a Schottky barrier;

c. a first gate disposed adjacent to and in physical contact with a part of a second surface of said first insulating layer, said gate being electrically insulated from said substrate;

d. first means for applying a bias potential to said first gate for creating a channel in said substrate between said source region and said drain region whereby charge carriers are caused to flow therethrough;

e. a second layer of insulating material having a first surface disposed adjacent to and in physical contact with another part of said second surface of said first insulating layer and further disposed so as to insulate said first gate, said second insulating layer having trap means distributed therein for trapping certain of said charge carriers;

f. a second gate disposed adjacent to and in physical contact with a second surface of said second layer and further disposed to overlap at least part of said channel so as to facilitate the establishment of a depletion region within said channel;

g. second means for applying a potential to said drain region so as to establish a depletion region within said part of said channel overlapped by said second gate; and h. third means for applying an accelerating potential to said second gate for accelerating said certain charge carriers from said channel over said Schottky barrier and into said trap means.

9. The combination claimed in claim 8 wherein said semiconductor substrate is silicon.

10. The combination claimed in claim 8 wherein said first insulating material is silicon dioxide ($SiO_2$).

11. The combination of claim 8 wherein said second insulating material is silicon nitride ($Si_3N_4$).

12. The combination claimed in claim 8 wherein said first gate is metallic.

13. The combination claimed in claim 8 wherein said second gate is metallic.

14. The combination claimed in claim 8 wherein said source region and said drain region are of N-type conductivity and said charge carriers are electrons.

15. The combination claimed in claim 8 wherein said source region and said drain region are of P-type conductivity and said charge carriers are holes.

16. The combination claimed in claim 8 wherein said second gate overlaps the part of said drain region and part of said channel.

17. The combination claimed in claim 8 wherein said first gate overlaps part of said source region and part of said channel.

18. The combination claimed in claim 17 wherein said second gate overlaps said drain region and said first gate whereby said channel is completely overlapped by the combination of said first and second gates.

19. A solid-state storage device comprising:

a. a semiconductor substrate having spaced source and drain regions disposed within and adjacent a common surface of said substrate;
b. a first layer of insulating material having a first surface disposed adjacent to and in physical contact with said common surface of said substrate, the interface between said substrate and said first insulating layer defining a Schottky barrier;
c. a second layer of insulating material having a first surface disposed adjacent to and in physical contact with a second surface of first insulating layer, and having trap means distributed therein for trapping charge carriers emanating from said source region;
d. a first gate disposed adjacent to and in physical contact with a part of second surface of said second insulating layer, said hate being electrically insulated from said substrate;
e. first means for applying a bias potential to said first gate for creating a channel in said substrate between said source region and said drain region whereby said charge carriers emanating from said source region are caused to flow therethrough;
f. a third layer of insulating material having a first surface disposed adjacent to and in physical contact with another part of said second surface of said second insulating later and further disposed so as to insulate said first gate;
g. a second gate disposed adjacent to and in physical contact with a second surface of said third layer and further disposed to overlap at least part of said channel so as to facilitate the establishment of a depletion region within said channel;
h. second means for applying a potential to said drain region so as to establish a depletion region within said part of said channel overlapped by said second gate; and
i. third means for applying an accelerating potential to said second gate for accelerating certain of said charge carriers from said channel over said Schottky barrier and into said trap means.

20. The combination claimed in claim 19 wherein said semiconductor substrate is silicon.

21. The combination claimed in claim 19 wherein said first insulating material is silicon dioxide ($SiO_2$).

22. The combination claimed in claim 19 wherein said second insulating material is silicon nitride ($Si_3N_4$).

23. The combination claimed in claim 19 wherein said third insulating material is silicon nitride ($Si_3N_4$).

24. The combination claimed in claim 19 wherein said first gate is metallic.

25. The combination claimed in claim 19 wherein said second gate is metallic.

26. The combination claimed in claim 19 wherein said source region and said drain region are of N-type conductivity and said charge carriers are electrons.

27. The combination claimed in claim 19 wherein said source region and said drain region are of P-type conductivity and said charge carriers are holes.

28 The combination claimed in claim 19 wherein said second gate overlaps part of said drain region and part of said channel.

29. The combination claimed in claim 19, wherein said first gate overlaps part of said source region and part of said channel.

30. The combination claimed in claim 19, wherein said second gate overlaps said drain region and said first gate whereby said channel is completely overlapped by the combination of said first and second gates.

PO-1050
(5/69)

UNITED STATES PATENT OFFICE
CERTIFICATE OF CORRECTION

Patent No. 3,577,210 Dated May 4, 1971

Inventor(s) Hans G. Dill

It is certified that error appears in the above-identified patent and that said Letters Patent are hereby corrected as shown below:

Column 1, line 23, "this" should be --the--;
25, after "band" insert --of the semiconductor appearing in the conduction band--;
42, after "threshold" insert --voltage--;
44, after "Lin" insert --(--.
Column 3, line 30, after "110" (second occurrence), insert --a--;
41, after "established" insert --thereon--;
70, after "to" insert --the--;
72, after "exert" insert --the--.
Column 4, line 39, "neat" should be --near--;
44, after "it" insert --is-- and delete "in accordance with the invention in";
52, "facilitate" should be --facilitates--;
57, "equipment" should be --requirement--;
58, "facilitate" should be --facilitates--;
63, "and" should be --as--.
Column 5, line 12, after "device" insert --,--;
17, "later" should be --layer--;
29, "stopped" should be --stored--;
49, after "eliminates" insert --the--;
65, "embodiment" should be --embodiments--;
74, "and" should be --end--.
Column 7, line 7, after "combination" delete "of" and insert --claimed in--;
20, after "overlaps" delete "the";
44, after "of" (first occurrence) insert --a--;
45, "hate" should be --gate--.
Column 8, line 6, "later" should be --layer--'
44, "19" should be --29--.

Signed and sealed this 26th day of October 1971.

(SEAL)
Attest:

EDWARD M.FLETCHER,JR.
Attesting Officer

ROBERT GOTTSCHALK
Acting Commissioner of Patents